United States Patent [19]

Birmingham et al.

[11] Patent Number: 5,416,271
[45] Date of Patent: May 16, 1995

[54] ELECTRICAL CABLE PENETRATION SEAL WITH COMPLIANT MODULE

[75] Inventors: John A. Birmingham, Broken Arrow; Rogers A. Moore, Afton, both of Okla.

[73] Assignee: General Signal Corporation, Stamford, Conn.

[21] Appl. No.: 237,972

[22] Filed: May 4, 1994

Related U.S. Application Data

[63] Continuation of Ser. No. 784,295, Oct. 29, 1991, abandoned.

[51] Int. Cl.⁶ .................. H02G 3/18; H01R 13/639
[52] U.S. Cl. ...................... 174/65 R; 174/48
[58] Field of Search ............ 174/48, 65 R, 76, 77 R, 174/93, 99 R, 65 SS; 248/56, 68.1; 439/465, 466, 469, 472, 473, 604, 606

[56] References Cited

U.S. PATENT DOCUMENTS

| | | | |
|---|---|---|---|
| 2,732,226 | 1/1956 | Brattberg | 174/48 |
| 3,879,575 | 4/1975 | Dobbin et al. | 174/76 X |
| 3,889,047 | 6/1975 | Carver | 174/76 X |
| 4,461,529 | 6/1984 | Fariss | 439/604 |
| 4,656,313 | 4/1987 | Moore et al. | 174/48 X |
| 4,677,253 | 6/1987 | Blomqvist | 174/48 X |
| 4,733,016 | 3/1988 | Twist et al. | 174/65 |
| 4,767,356 | 8/1988 | Grappe | 439/465 X |
| 4,849,580 | 7/1989 | Reuter | 174/76 X |
| 5,099,088 | 3/1992 | Usami et al. | 174/76 |

FOREIGN PATENT DOCUMENTS 384053  8/1990  European Pat. Off. ............ 439/604

Primary Examiner—Peter Dungba Vo
Attorney, Agent, or Firm—Milton E. Kleinman; Raymond E. Smiley; Robert S. Smith

[57] ABSTRACT

An electrical cable penetration seal apparatus which includes a compliant module having an inner and outer regions of different durometer characteristics. In some forms of the invention the outer region has a higher durometer elastomer and a central region which is made from a lower durometer elastomer. The compliant module has an outer rectangular cross-section and the central region is a cylindrically shaped in some forms of the invention.

13 Claims, 2 Drawing Sheets

ELECTRICAL CABLE PENETRATION SEAL WITH COMPLIANT MODULE

This is a continuation of application Ser. No. 07/784,295, filed on Oct. 29, 1991, now abandoned.

BACKGROUND OF THE INVENTION

The invention relates to devices used to facilitate fire-resistant, pressure-tight penetrations of decks, bulkheads, walls, floors, and similar partitions. The invention will be described primarily in terms of electrical power, control and communications cables although it will be understood that the same apparatus will also have application to other penetrating items.

Such devices are described in the Brattberg U.S. Pat. Nos. 2,732,226; and 3,282,544 and other patents, and are generally known as through-penetration firestop devices or transits.

Typically these devices consist of a series of rubber modules designed to fit closely around individual cables. The modules are retained in a frame which is attached to the deck, bulkhead, wall, floor, or similar partition. The frame is most commonly steel, but may be made of other materials. Each rubber module is typically molded in two halves, forming a block with a cylindrical center passage. The modules are molded in various sizes to cover the range of cable diameters. The rubber is typically controlled to a durometer hardness range of 65 to 80, to ensure mechanical stability when subjected to high pressures. Accessory items are furnished to anchor rows of modules in place, and to close the final opening in the frame while putting the modules in compression.

Transit systems are used whenever there is a fairly large cable population to be accommodated in limited space. A pressure tight, fire-resistant seal is required, for example, in ships bulkheads, to permit electrical cables to enter water-tight compartments. The effectiveness of the seal depends on a close fit between the individual modules and the cables they enclose, and on the compression and retention of the assembly of modules in the supporting frame.

There are several factors that influence the quality of the fit between the inner groove of the module and the cable. Cables usually are not perfectly round or straight, and their diameters are neither uniform nor exact. Since modules must be molded in discrete sizes, a perfect fit is improbable. In the past, cable jackets have been relatively soft and compliant. The rubber module and cable jacket have been capable of mutual deformation, so that a close fit develops when the system is put in compression.

Improvements in cable jacket and insulation materials in recent years have concentrated on fire performance. New materials have been introduced with low flame spread and smoke emission characteristics. Cable jackets made with these materials are significantly harder and more rigid. The stiffness of the jacket materials has made it more difficult to obtain a close fit of module to the cable. While it might appear that reducing the hardness of the module would produce a compensating ability to conform to cable variations, this approach has proved impractical. When the modules are made sufficiently soft, the column strength of the rubber mass under compression is too low for stability, resulting in excessive deformation of the modules and leakage at lower pressures.

One solution to this problem is to provide modules with interior grooves or contours, creating multiple diameters. The effect of this design is to reduce the bearing surface of the module on cable, increasing the force available to produce mutual deformation. In this way it is possible to maintain good pressure tightness, but at the price of much higher local stress concentration on the cable jacket. The long term effect on cable jacket performance is not known, but believed to be adverse.

The prior art includes the structures described in the following U.S. Pat. Nos. 1,603,991 V. I. Smithers; 1,947,481 F. C. Meyer; 2,732,226; 3,569,608 Louis Ace; 3,655,907 R. A. Philibert et al; Des. 249,558 M. Blomqvist; Des. 249,559 M. Blomqvist 4,291,195 Blomqvist; Des. 253,554 M. Blomqvist; 4,656,313 Moore et al; Des. 714,860 M. Blomqvist; 4,677,253 M. Blomqvist; 4,733,016 M. Twist et al, 4,767,086 M. Blomqvist. These patents while being generally relevant do not suggest a solution to the problems with which the present invention is concerned.

It is an object of the invention to provide a more close fit in a through-penetration firestop device or transit between the individual modules and the cables they enclose. This object of the invention is to improve the fluid pressure seal to thus reduce passage of noxious or explosive gases into compartments.

This object also contemplates prevention the passage of liquids around cable jackets of unusual or irregular shape or design.

It is an object of the invention to provide apparatus which is inexpensive to manufacture as well as requires a minimum of labor to install.

Still another object of the invention is to combine the advantages of the low durometer rubber to conform to variations in cable jacket shape or dimension with high durometer for mechanical strength and stability.

Yet another object of the invention is to accommodate a wider range of cable diameters than would be possible with ordinary modules of prior design, thus reducing both inventory and tooling requirements.

Still another object of the invention is to eliminate the need for convoluted interior surfaces for sealing that can damage cable jackets. Thus it is an object to reduce cable jacket compression that could otherwise lower the dielectric strength of the cable jacket material.

Another object of the invention is to simplify installation requirements by accommodating non-compliant or irregularly shaped penetrating items.

It is also an object of the invention to provide a structure that when exposed to a fire condition the elastomer expands to close apertures caused by the burning away of cable jackets. This effect is known as "intumescence."

SUMMARY OF THE INVENTION

It has now been found that these and other objects of the invention may be attained in an electrical cable penetration seal apparatus which includes a compliant module having inner and outer regions of different durometer characteristics.

In some forms of the invention the outer region has a higher durometer elastomer and a central region which is made from a lower durometer elastomer. The compliant module has an outer rectangular cross-section and the central region is cylindrically shaped in some forms of the invention. The central region may have a lower durometer hardness than the range of 65 to 80 such as a durometer of 25-35. The outer region may have a durometer hardness in the range of 65 to 80.

The inner region may have a thickness substantially between 1.5 and 3 mm and a different color than the outer region. The inner region may be manufactured of a non-intumescent material and the outer region may be manufactured of an intumescent material. The inner region is manufactured of a neoprene based rubber or a chloroprene based rubber in some forms of the invention. In other forms of the invention the outer region is manufactured of a relatively hard polymeric thermosetting material and an inner region of lower durometer material region.

BRIEF DESCRIPTION OF THE DRAWING

The invention will be better understood by reference to the accompanying drawing in which.

DESCRIPTION OF THE PREFERRED EMBODIMENT

Referring now to FIGS. 1, 3-5 there is shown an electrical cable penetration seal with compliant module assembly in accordance with one form of the invention.

Figure 2:
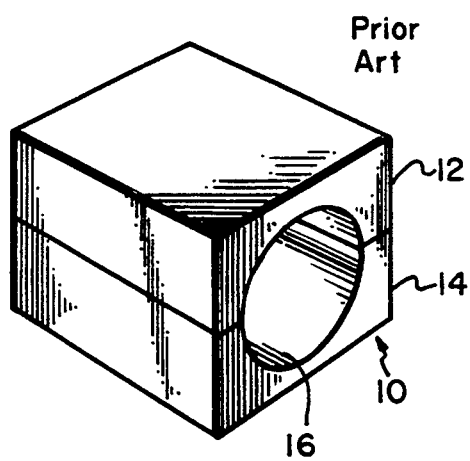
FIG. 2 is a perspective view of a prior art module.

In general the prior art sealing modules 10 as shown in FIG. 2 consist of elastomeric blocks separated into two mating halves 12, 14 with a central groove or passage 16 dimensioned to accommodate pipes or cables and an outer surface dimensioned and configured to permit multiple modules 10 to be disposed contained under compression in a frame (not shown). The central passage 16 is most often cylindrical, but may be rectangular or otherwise shaped to conform to the penetrating item. The outside shape is most often rectangular, but may also be hexagonal or round, as determined by the design of the containing frame. The elastomeric material may be rubber, such as neoprene, chloroprene, or EPDM, or it may be some other polymeric material. Formulation of the elastomer is generally designed to yield a durometer hardness in the range of 65 to 80. The elastomer may be modified by incorporating ingredients to create intumescent properties, described below.

"Intumescence, " as applied to fire protective materials, is a chemical process taking place at elevated temperatures, usually in the range of 250 degrees F. to 400 degrees F., which results in an increase in volume accompanied by the formation of an insulating char. Various chemical reactions, all well known in the literature, are employed to achieve intumescent properties.

Modules are designed with outside dimensions in suitable multiples of standard dimensions, to facilitate installation of numerous penetrating items through single frame openings. When the modules use a square face, it is customary to designate the module by its outside dimension and the groove diameter.

Figure 3:
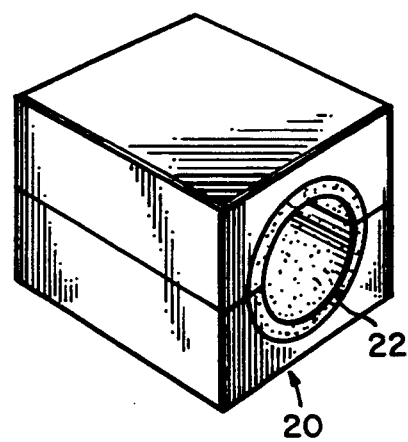
FIG. 3 is a perspective view of a module in accordance with one form of the invention.

The compliant module 20 in accordance with one form of the invention as best seen in FIG. 3 differs from the known module 10 because of the cylindrically shaped region 22 of the module 20. This region 22 surrounds the penetrating item and is made of a relatively low durometer elastomer. This low durometer or "soft" region permits the module 20 to conform readily to variations or irregularities in the shape or dimensions of the penetrating item. The remainder of the module is of the usual durometer hardness, and constitutes the structural portion of the module. Ordinarily the region manufactured of soft elastomer is a cylindrically shaped although other shapes may be used. For example, if the penetrating item has a rectangular shape the region 22 may be also have a rectangular outer and inner cross section. For simplicity the description will refer to cylindrical shapes even though other forms are contemplated by the present invention.

In the preferred form of the invention the compliant module is comprised of an outer region of intumescent neoprene (or chloroprene-based rubber) and an inner region ranging from 1.5 mm to 3 mm thick of low durometer non-intumescent rubber. The outer region ordinarily will have a durometer in the range of 65-80. The inner region 22 will preferably have a durometer in the range of 25-35. The two materials may be colored differently to distinguish the modules 20 from conventional modules 10. It will be understood that for simplicity the numeral 20 has been used to identify compliant modules of various sizes.

The invention permits a novel means of sealing cables, conduit and other penetrating items in an assembly otherwise well known in the industry and exemplified by the sealing systems manufactured by Hevi-Duty/-Nelson, a unit of General Signal, Post Office Box 726, Tulsa, Okla. 74101, and identified as the "Hevi-Duty/-Nelson Multi-Cable Transit and Multi-Plug Systems" both also known as MCT Products. These systems permit the installation of penetrating items in walls, floors, ceilings, ships' bulkheads, decks, and other partitions requiring penetration seals.

Figure 1:
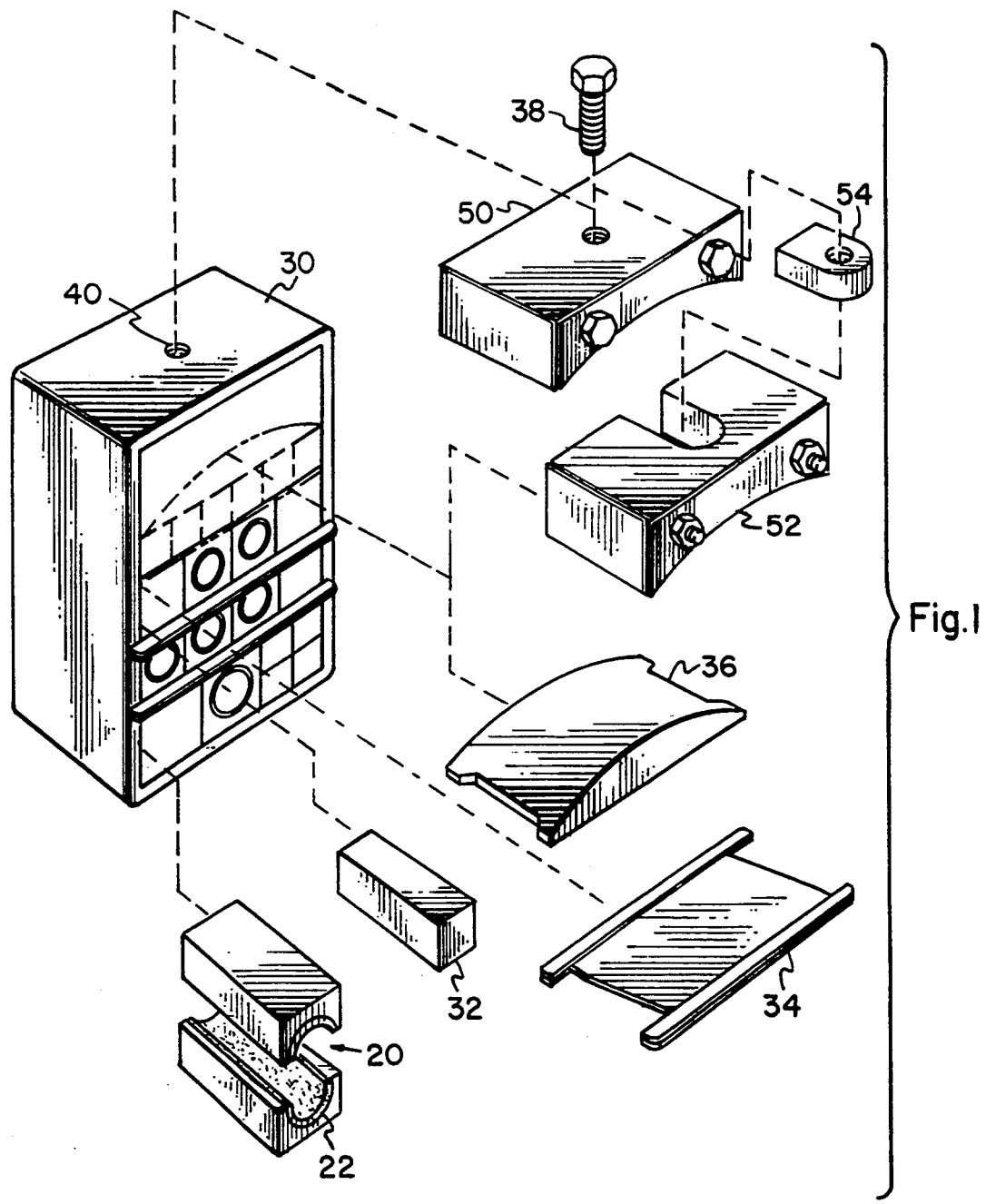
FIG. 1 is an exploded perspective view of an electrical cable penetration seal with compliant module assembly in accordance with one form of the invention.
Figure 4:
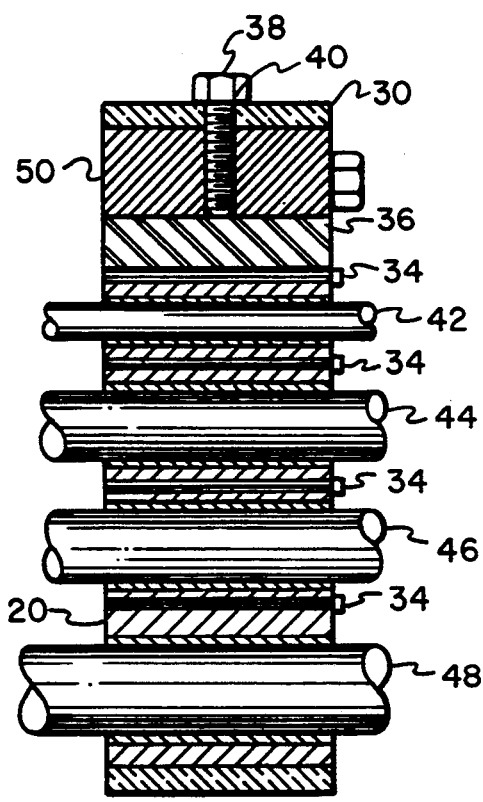
FIG. 4 is a sectional view taken along a vertical plane of the assembly shown in FIG. 1.
Figure 5:
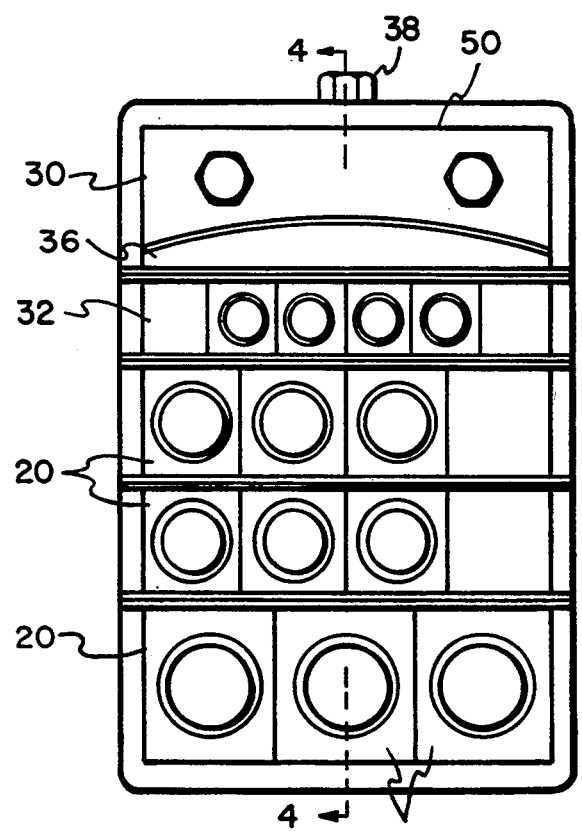
FIG. 5 is a side elevational view of the apparatus shown in FIG. 1.

Referring now particularly to FIGS. 1, 4 and 5 a metallic frame 30 is installed with its opening coincident with the opening in the partition (not shown). Rows of compliant modules 20 are positioned across the frame opening. Each module 20 surrounds one cable (not shown). Spare insert blocks 32 fill any unused spaces. The rows of modules 20 are separated by stayplates 34, which serve to lock the modules 20 in place and stabilize the assembly.

When the frame 30 is filled to capacity, a compression plate 36 is inserted over the top row of modules 20. A compression bolt 38 passes through a threaded hole 40 in the top of frame 30 is tightened against the compression plate 36, thereby applying a uniform pressure on the complete assembly. The pressure forces all the modules 20 to close tightly around the cables 42, 44, 46, 48 and the rubber parts deform as necessary to close all leakage paths. Either a first alternative end packing 50 or a second alternative end packing comprising elements 52, 54 closes the remaining small opening above the compression plate 36. The second alternative end packing comprising elements 52, 54 is used for those installations where only one face of the assembly is accessible during installation.

The assembly in accordance with the preferred form of the invention has important advantages over known apparatus. More particularly, the resilient cylindrical region 22 provides an improved fluid seal that will reduce passage of noxious or explosive gases into compartments as well as preventing passage of liquids around cable jackets even if they are of unusual or irregular shape or design. The apparatus will also accommodate a wider range of cable diameters than would be possible with ordinary modules of prior design, thus reducing both inventory and tooling requirements. A still further advantage is that the resilient portion eliminates the need for convoluted interior surfaces for sealing that may damage cable jackets. This damage may include physical damage that leads to lower dielectric strength of the jacket material. The invention also simplifies installation requirements by accommodating non-compliant or irregularly shaped penetrating items.

In the preferred form of the invention, a novel feature of the compliant module is that when exposed to a fire condition the elastomer expands to close apertures caused by the burning away of cable jackets. This effect is known as "intumescence."

Two compliant modular systems may be placed in back to back position to increase the advantages. When the compliant module concept in accordance with the invention is applied to EMI/EMP electrical cable penetration seals, the advantage of improved conformation to cable dimensions is obtained without sacrificing EMI/EMP protection.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described our invention we claim:

1. An electrical cable penetration seal apparatus for cooperation with a plurality of associated cables which comprises:
    a plurality of compliant modules, each compliant module having an inner region in which a passageway is defined, said passageway being dimensioned and configured to surround one of the plurality of associated cables, each of said modules having an outer region disposed around said inner region, said inner region being an elastomer having a first durometer characteristic and said outer region being an elastomer having a second durometer characteristic, said inner region completely surrounding said passageway in at least one cross section of each of said compliant modules, said outer region completely surrounding said inner region in said one cross section; and
    means for securing said plurality of compliant modules together;
    each of said outer regions in each of said compliant modules having a higher durometer characteristic than said inner region in that compliant module, each of said compliant modules has an outer rectangular cross-section, said passageway and said inner region are cylindrically shaped, each of said inner regions having a durometer characteristic in the range of 25–35.

2. The apparatus as described in claim 1 wherein:
    each of said outer regions has a durometer characteristic in the range of 65 to 80.

3. The apparatus as described in claim 2 wherein:
    each of said inner regions has a thickness of between 1.5 and 3 mm.

4. The apparatus as described in claim 3 wherein:
    each of said inner and outer regions are differently colored.

5. The apparatus as described in claim 4 wherein:
    each of said outer regions is manufactured of an intumescent material.

6. The apparatus as described in claim 5 wherein:
    each of said inner regions is manufactured of a non-intumescent material.

7. The apparatus as described in claim 6 wherein:
    said inner region is manufactured of a neoprene based rubber.

8. The apparatus as described in claim 7 further including:
    each of said inner regions is manufactured of a chloroprene based rubber.

9. The apparatus as described in claim 8 wherein:
    each of said outer regions is manufactured of a relatively hard polymeric thermosetting material.

10. An electrical cable penetration seal apparatus for cooperation with a plurality of associated cables which comprises:
    a plurality of compliant modules, each compliant module having an inner region in which a passageway is defined, said passageway being dimensioned and configured to surround one of the plurality of associated cables, each of said modules having an outer regions disposed around said inner region, said inner region being an elastomer having a first durometer characteristic and said outer region being an elastomer having a second durometer characteristic, said inner region completely surrounding said passageway in at least one cross section of each of said compliant modules, said outer region completely surrounding said inner region in said one cross section; and
    means for securing said plurality of compliant modules together, each of said outer regions in any one of said compliant module has a higher durometer characteristic than said inner region in that compliant module, said inner region is cylindrically shaped, each of said inner regions having a durometer characteristic in the range of 25–35.

11. The apparatus as described in claim 10 wherein:
    each of said outer regions has a durometer hardness in the range of 65 to 80.

12. The apparatus as described in claim 11 wherein:
    each of said inner regions has a thickness substantially between 1.5 and 3 mm.

13. The apparatus as described in claim 12 wherein:
    each of said inner and outer regions are differently colored.

* * * * *